US012645646B2

(12) United States Patent
Mori et al.

(10) Patent No.: US 12,645,646 B2
(45) Date of Patent: Jun. 2, 2026

(54) CLEARING METHOD AND SYSTEM USING ARTIFICIAL INTELLIGENCE

(71) Applicant: Visa International Service Association, San Francisco, CA (US)

(72) Inventors: Michael Mori, San Mateo, CA (US); Gourab Basu, Half Moon Bay, CA (US); Austin Jones, Oakland, CA (US); Catherine Jing, San Mateo, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 18/884,692

(22) Filed: Sep. 13, 2024

(65) Prior Publication Data

US 2025/0094389 A1      Mar. 20, 2025

Related U.S. Application Data

(60) Provisional application No. 63/582,983, filed on Sep. 15, 2023.

(51) Int. Cl.
*G06F 16/174* (2019.01)
*G06N 3/042* (2023.01)

(52) U.S. Cl.
CPC ......... *G06F 16/1748* (2019.01); *G06N 3/042* (2023.01)

(58) Field of Classification Search
CPC ........................... G06F 16/1748; G06N 3/042
See application file for complete search history.

(56) References Cited

U.S. PATENT DOCUMENTS

| | | | |
|---|---|---|---|
| 8,725,642 B2 | 5/2014 | Fordyce, III | |
| 10,740,731 B2 | 8/2020 | Basu et al. | |
| 11,416,780 B1 * | 8/2022 | Beskales ................ | G06N 20/00 |
| 2019/0370812 A1 * | 12/2019 | Kandasamy ........... | G06N 3/042 |
| 2022/0245516 A1 | 8/2022 | Kan et al. | |
| 2023/0342588 A1 * | 10/2023 | Kramer ................. | G06N 3/042 |

* cited by examiner

*Primary Examiner* — Tyler J Torgrimson
(74) *Attorney, Agent, or Firm* — Kilpatrick Townsend & Stockton LLP

(57) ABSTRACT

A method is disclosed. It includes receiving, by a clearing system comprising an artificial intelligence model, a clearing file comprising a plurality of clearing records. It also includes inputting the clearing records into the artificial intelligence model, and then determining, by the artificial intelligence model, predictions relating to the clearing records. It also includes providing the predictions to an authorizing entity computer. The authorizing entity computer performs actions based on the predictions.

20 Claims, 10 Drawing Sheets

CLEARING METHOD AND SYSTEM USING ARTIFICIAL INTELLIGENCE

CROSS-REFERENCES TO RELATED APPLICATIONS

This is a non-provisional application, which claims priority to U.S. Provisional Application No. 63/582,983 filed on Sep. 15, 2023, which is herein incorporated by reference in its entirety.

BACKGROUND

Today, in the dual message card processing ecosystem, entities can operate in a real-time authorization plus batch based clearing and settlement flow environment. A transaction is only considered complete when it is authorized, cleared, and settled. The clearing phase is often operational, delayed, and outdated which presents integrity and logical loopholes. Uncertainty delays the clearing, which requires additional workload form the issuers and takes away from consumer experience. A tool to reduce risk in the clearing process is needed.

Embodiments of the disclosure address this problem and other problems individually and collectively.

SUMMARY

Embodiments of the invention are directed to transaction clearing systems and methods.

One embodiment includes a method comprising: receiving, by a clearing system comprising an artificial intelligence model, a clearing file comprising a plurality of clearing records; inputting, by the clearing system, the clearing records into the artificial intelligence model; determining, by the artificial intelligence model, predictions relating to the clearing records; and providing, by the clearing system, the predictions to an authorizing entity computer, whereby the authorizing entity computer performs actions based on the predictions.

Another embodiment of the invention includes a clearing system comprising: one or more processors; and one or more computer readable media comprising code executable by the one or more processors to perform a method comprising: receiving a clearing file comprising a plurality of clearing records; inputting the clearing records into an artificial intelligence model; determining predictions relating to the clearing records; and providing the predictions to an authorizing entity computer, whereby the authorizing entity computer performs an action based on the predictions.

Another embodiment of the invention includes data processing system comprising: a clearing system comprising, one or more processors, and one or more computer readable media comprising code executable by the one or more processors to perform a method comprising, receiving a clearing file comprising a plurality of clearing records, inputting the clearing records into an artificial intelligence model, determining predictions relating to the clearing records, and providing the predictions to an authorizing entity computer, whereby the authorizing entity computer performs an action based on the predictions; and the authorizing entity computer.

These and other embodiments are described in further detail below.

DETAILED DESCRIPTION

Figure 1:
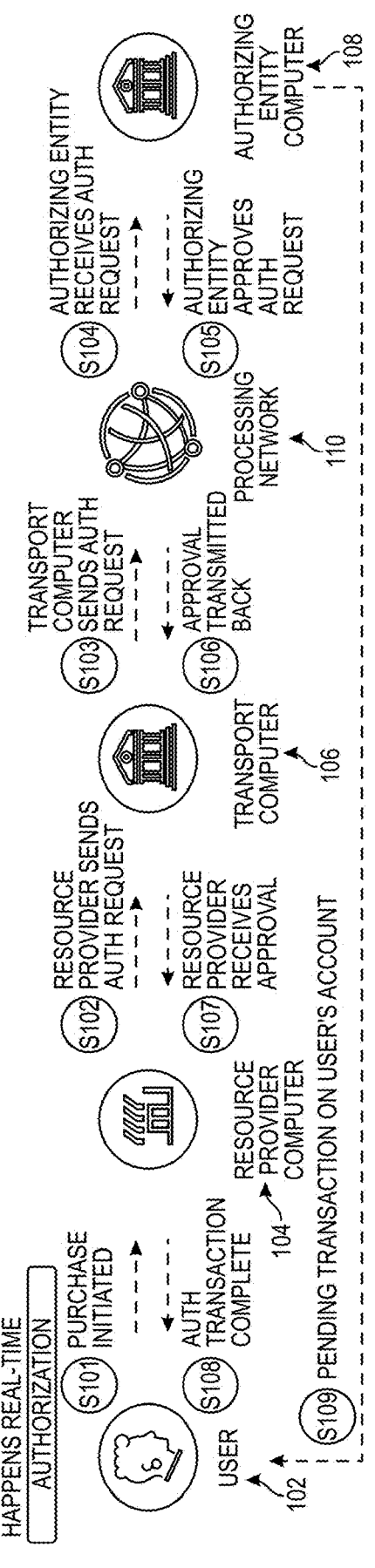
FIG. 1 shows a flow diagram of a transaction authorization process.

Prior to discussing embodiments of the disclosure, some terms can be described in further detail.

A "resource provider" may be an entity that can provide a resource such as goods, services, information, and/or access. Examples of resource providers includes merchants, data providers, transit agencies, governmental entities, venue, and dwelling operators, etc.

A "merchant" may typically be an entity that engages in transactions and can sell goods or services, or provide access to goods or services.

"Clearing" is a process in which an authorizing entity computer (e.g., operated by an issuer) exchanges transaction information with a transport computer (e.g., operated by an acquirer). After successful reconciliation, the transport computer generates an outgoing a clearing file various schemes (e.g., payment card networks). These schemes then break down these files in into records and processes them. The records are sent to various authorizing entity computers for settlement.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a username, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "processing network" may include data processing subsystems, networks, and operations used to support and deliver certificate authority services, authorization services, exception file services, and clearing and settlement services. An exemplary processing network may include VisaNet™. Processing networks such as VisaNet™ are able to process credit card transactions, debit card transactions, and other types of commercial transactions. The processing network may include a server computer. The processing network may use any suitable wired or wireless network, including the Internet.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

The term "artificial intelligence model" or "AI model" may refer to a model that may be used to predict outcomes in order achieve a target goal. The AI model may be developed using a learning algorithm, in which training data is classified based on known or inferred patterns. An AI model may also be referred to as a "machine learning model."

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, models that classify data by establishing a gap or boundary between inputs of different classifications, as well as neural networks, collections of artificial "neurons" that perform functions by activating in response to inputs.

A "feature" can include an individual measurable property or characteristic of a phenomenon. A feature can be numeric (e.g., a value, a vector, a matrix, etc.) or structural (e.g., strings, graphics, etc.). A numeric feature can be described by a feature vector.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex input, such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

An "embedding" can be a relatively low-dimensional space into which high-dimensional vectors can be translated. In some embodiments, an embedding can be a mapping of a discrete—categorical—variable to a vector of continuous numbers. In the context of neural networks, embeddings can be low-dimensional, learned continuous vector representations of discrete variables. Neural network embeddings can reduce the dimensionality of categorical variables and meaningfully represent categories in a transformed space.

A "processor" may refer to any suitable data computation device or devices. A processor may comprise one or more microprocessors working together to achieve a desired function. The processor may include a CPU that comprises at least one high-speed data processor adequate to execute program components for executing user and/or system generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xenon, and/or Xscale; and/or the like processor(s).

A "memory" may refer to any suitable device or devices that may store electronic data. A suitable memory may comprise a non-transitory computer readable medium that stores instructions that can be executed by a processor to implement a desired method. Examples of memories including one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A transaction can be initiated when a user provides payment to a resource provider (e.g., merchant). For example, the user can make a purchase from a resource provider using a credit card. The resource provider operates a resource provider computer, which then forwards the user's payment information (e.g., via a transport computer and a processing network) in an authorization request message to an authorizing entity computer (e.g., operated by an issuer) for authorization. During authorization, the authorizing entity computer decides whether the transaction is approved or declined in real time and posts the authorization decision. The authorizing entity computer checks that the user is allowed to conduct the transaction and has sufficient funds available in their account. If the transaction is approved, the resource provider grants the user access to an item or good.

To illustrate, FIG. 1 shows a flow diagram of a payment authorization process. In FIG. 1, a user 102 provides payment during a transaction with a resource provider operating a resource provider computer 104. The user 102 may be operating a user device such as a mobile phone or card that contains a credential (e.g., a primary account number) or a token and this token may be provided to the resource provider computer 104. The resource provider computer 104 sends an authorization request message comprising the credential or the token and a transaction amount to a transport computer 106, which sends the authorization request message to an authorizing entity computer 108 via a processing network 110. The authorizing entity computer 108 may be operated by an authorizing entity such as an issuing bank, which manages an account on behalf of the user 102.

Messages between entities in FIG. 1 (as well as FIGS. 2-3) can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

More specifically, at step S101, the user 102 wishes to obtain access to a resource such as a good or service from a resource provider computer 104. The user 102 provides access data (e.g., PAN or primary account number, user credentials, cryptogram, etc.) to the resource provider computer 104, which then initiates a transaction. For example, the user 102 can tap or swipe a credit card on a merchant POS, and the merchant POS obtains payment information from the credit card. In another example, the user 102 inputs payment information to a checkout page at an e-commerce website.

At steps S102-S103, after the resource provider computer 104 receives the payment information, the resource provider computer 104 generates and transmits an authorization request to the processing network 110 via a transport computer 106.

At step S104, after receiving the authorization request from the transport computer 106, the processing network 110 routes the authorization request to the authorizing entity 108. In some embodiments, the processing network 110 may modify the authorization request prior to sending it to the authorizing entity (e.g., replace a tokenized credential with a PAN).

At step S105, after receiving the authorization request from the processing network 110, the authorizing entity 108 makes an authorization decision and transmits the decision in an authorization response message. The decision is made in real time (e.g., within 30 seconds). The authorizing entity 108 may check that the user is allowed to conduct the transaction and has sufficient funds available. The authorizing entity 108 transmits an authorization response comprising the authorization decision back to the resource provider computer 104 in steps S105-S107.

At step S108, the user 102 receives notification that the transaction is authorized. For example, the merchant POS may notify the user 102 that the payment was accepted, and the resource provider computer 104 may grant the user 102 access to the item or good.

If the transaction is authorized, at S109 the authorizing entity 108 places a temporary hold on the user's account. To the user 102, their available credit balance will be reduced by the hold amount, and they will see a "pending transaction" on their account. The amount of the hold is usually the same as the authorization amount except for some special cases such as in the hotel and fuel merchant categories. The hold lasts until the authorizing entity 108 officially posts the transaction to the user's account during clearing (e.g., as long as 7 days or more depending on the type of transaction).

Clearing enables verification of transaction data, which is important for fraud and chargeback prevention. In batch transaction processing, the clearing process occurs separately from authorization. The resource provider may collect all the transactions from that day, and send them to a transport computer (e.g., operated by an acquirer bank) to distribute to the respective authorizing entities for clearing.

Figure 2:
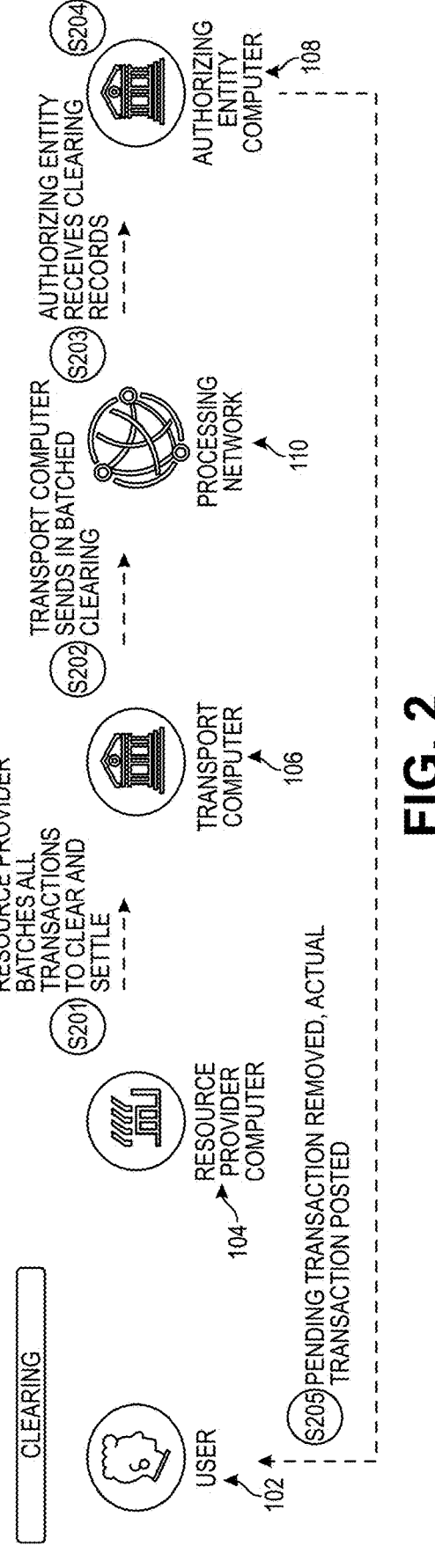
FIG. 2 shows a flow diagram of a batch clearing process.

FIG. 2 shows a flow diagram of a batch clearing process. Clearing can occur at the end of day or any suitable period of time, depending on the type of transaction or resource provider. FIG. 2 shows a user 102, a resource provider computer 104, a transport computer 106, a processing network 110, and an authorizing entity computer 108, which may be the same as shown in FIG. 1. Throughout the day, the resource provider computer 104 may conduct a plurality of transactions with various users. The clearing process shown in FIG. 2 occurs after authorization processes like those shown in FIG. 1 are complete. It verifies the transaction data, finalizes the funds, and initiates the settlement for transactions like the one described with respect to in FIG. 1.

At step S201-S202, the resource provider computer 104 collects all the transactions from the day for clearing and settlement. The resource provider computer 104 sends the batched transactions to the processing network 110 via the transport computer 106. The batched clearing records may be based on final transaction amounts for a plurality of transactions for that day, and may in a clearing file that is sent from the transport computer 106 to the processing network 110.

At step S203, the processing network 110 routes the clearing records to the respective authorizing entities. For example, the processing network 110 may organize and consolidate the clearing records based on the authorizing entity of the account that initiated the transaction. The authorizing entity 108 may receive clearing records for the transactions which were initiated by accounts held with authorizing entity 108.

At step S205, when the authorizing entity 108 receives the clearing records, it posts the transactions to the respective accounts, and removes previous holds. For example, for each clearing record, the authorizing entity 108 may identify the original matching authorization, drop the pending authorization, and officially post the transaction to the user's account. This is when the final charge shows up on the user's statement. In a merchandise return scenario, a clearing return would have to be matched with the original clearing record to complete the merchandize return transaction.

The transaction matching step (S205) of the clearing phase can become inefficient and/or problematic if there are data integrity or quality issues. Problems associated with the matching step can include unmatched clearings (e.g., a clearing record cannot be matched to a recent transaction authorization), a duplicate clearing (there are duplicate clearing records when where should only be one clearing record), or a delayed merchandise return processing (e.g., an authorizing entity spends an inordinate amount of time trying to locate original transaction data for a transaction associated with a return transaction).

In an unmatched clearing situation, an authorizing entity cannot match a clearing record to a previous authorization, and they may still have to post it. A user may see two transaction posts for the same payment event: a temporary hold on the user account and a fully posted transaction. This creates balance management issues and improper account holds, and the user may not be able to access funds. There may be an unmatched clearing if a resource provider submits a clearing record for a transaction that was made without a prior authorization. This may be by mistake (e.g., poor data quality), or intentionally as a "force post. Some force posts are legitimate: a transaction made on a cruise ship may not go through authorization because of poor connectivity. However, force posts are a common mechanism for fraud, so authorizing entities spend additional time and resources investigating unmatched clearings to determine if they are fraudulent force posts.

A duplicate clearing occurs when resource provider or transport computer processing errors produce two clearing records for the same authorization. The user may see a double posted charge, due to processing errors.

In a transaction return, the authorizing entity wishes to determine a merchandise return is legitimate so that the user is not sent funds to which they are not entitled. Verifying that a return transaction is associated with a prior transaction authorization is a time-consuming process for the authorizing entity, because they must match a clearing return record to an original clearing purchase record, but there is no linking element between the two.

Unmatched clearings, duplicate clearings, and delayed merchandise return processing can be burdensome for both the user and the authorizing entity. The user may suffer from a reduced availability of funds, causing an increase in service calls to the authorizing entity. The authorizing entity must deploy additional personnel and system bandwidth to face disputes.

Furthermore, in some embodiments, it is not until after a transaction is cleared that settlement occurs. Inefficiencies in the clearing process can delay the arrival of funds for resource providers and users (e.g., for merchandise returns).

Embodiments of the invention provide probability insights and transaction matching tools to authorizing entities and third-party processors during the transaction clearing process. The probability insights can leverage historical and real time transaction data such as historical merchants clearing history, regional transaction volume, and account level analysis. Embodiments can increase efficiency during the clearing process, thereby reducing the volume of disputes, and reducing computational time and resources compared to conventional processing.

Embodiments address unmatched clearings by providing a score indicating the likelihood of that a clearing record has a match to a prior authorization (e.g., an unmatched profiling score), and optionally a timeframe code indicating a timeframe that the authorization is most likely to fall within. If the score indicating the likelihood of a match to a prior authorization is high, then this information can be provided to the authorizing entity. In some embodiments, an identifier for the prior authorization can also be located for the authorizing entity. The authorizing entity computer can then take action on this score (e.g., post the transaction to the user's account), without actually attempting to locate the prior authorization.

Embodiments may also address duplicate clearings by providing a clearing score indicating the likelihood of a duplicate clearing record (e.g., a duplicate profiling score). If the score indicates that there is a high likelihood of a duplicate clearing, some embodiments may block the duplicate clearing transaction(s) for the authorizing entity and send it (or them) back to the transport computer to revise or investigate.

Embodiments of the invention may also address delayed merchandise returns processing, as embodiments of the invention can provide a score indicating the likelihood that the clearing return record matches an original purchase transaction (e.g., a matched profiling score).

With a clearing system optimized by embodiments, users are satisfied because they do not need to initiate disputes, while authorizing entities such as issuers benefit from increased network capacity and less CPU utilization.

Figure 3:
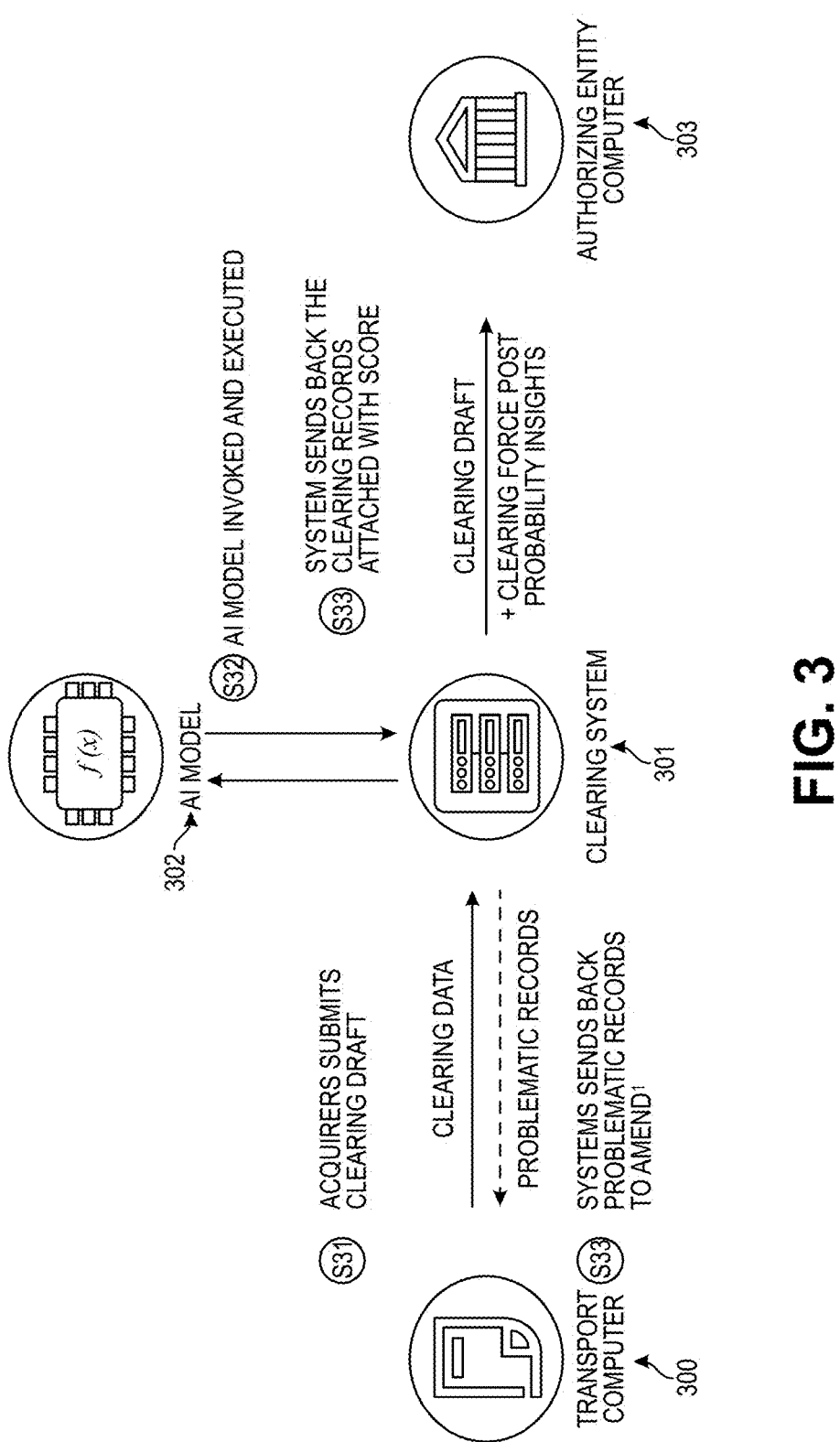
FIG. 3 shows a transaction clearing process flow for a clearing system enhanced with an artificial intelligence model according to embodiments.

FIG. 3 shows the transaction clearing process flow for a clearing system enhanced with an artificial intelligence model in a data processing system according to embodiments. FIG. 3 shows a data processing system comprising a transport computer 300, a clearing system 301, an artificial intelligence model 302, and an authorizing entity computer 303. The clearing system 301 and artificial intelligence model 302 may be part of a processing network in some embodiments.

In step S31, a transport computer 300 sends in a batch of clearing records to the clearing system 301. The batch of clearing records may be in a clearing file, and may be for transactions with a given resource provider, and other resource providers, over a period of time (e.g., a day).

In step S32, the clearing system 301 invokes the artificial intelligence model 302 to process the clearing records received from the transport computer 300. For each clearing record, the clearing system 301 can parse the clearing record and extract data elements from it. The extracted data elements are input to the artificial intelligence model 302, which is trained using features such as recent and historical authorization and clearing data, historical resource providers' clearing histories, regional transaction volumes, and account level analyses. The artificial intelligence model 302 can determine predictions using the input data from the clearing record. The predictions can include event types and scores. The scores may indicate a likelihood of a match to a prior authorization, a likelihood of a duplicate clearing record, and/or a likelihood of match to a prior purchase record.

In some embodiments, the artificial intelligence model 302 can include one or more submodels including a first submodel that determines a score indicating a likelihood of a match to a prior authorization (e.g., an unmatched profiling score), a second submodel for duplicate clearings that determines a score indicating a likelihood of a duplicate clearing record (e.g., a duplicate profiling score), and a third submodel for merchandise returns that determines a score indicating the likelihood of a match to a prior purchase record (e.g., an matched profiling score). The clearing system 301 may determine which artificial intelligence submodel to invoke based on the extracted data elements of each clearing record. For example, the clearing system 301 can extract the data elements from a clearing record, and determine that it is for a merchandise return. The clearing system 301 may invoke an artificial intelligence submodel that determines a matched profiling score which indicates the likelihood of a match to a prior purchase record.

Each clearing score in the clearing file may be associated with an event type indicator which categorizes the clearing score and reveals the meaning of the score (e.g., whether it indicates a likelihood of a match to a prior authorization, a likelihood of a duplicate clearing record, and/or a likelihood of match to a prior purchase record). The event type indicator may be a number which refers to an event type (e.g., event type 1: force post, event type 2: unmatched, event type 3: matched, etc.). After the artificial intelligence model 302 returns a clearing score, the clearing system 301 may categorize the clearing record by comparing the clearing score to one or more thresholds. In some embodiments, the clearing record is categorized by the artificial intelligence model 302, and the artificial intelligence model 302 returns an event type indicator in addition to the clearing score. For example, the artificial intelligence model 302 may provide an unmatched profiling score indicating the likelihood of a match to a prior authorization. The clearing system 301 or the artificial intelligence model 302 may compare the unmatched profiling score to a threshold to determine if the transaction can be categorized as a matched event type. If the score is above the matched threshold, the clearing system 301 or the artificial intelligence model 302 can set the event type indicator to "matched."

In step S33, the clearing system 301 sends a clearing draft including the clearing records and predictions (e.g., scores) produced by the artificial intelligence model 302 to the authorizing entity 303. Each clearing record in the clearing draft can comprise a clearing score and an event type indicator. In some embodiments, clearing scores may comprise a first byte to be an event type indicator, and a second and third byte to be a confidence level. This information can be in a data string comprises a first portion encoding an event type, and a second portion encoding a score. In some embodiments, the clearing draft may further comprise prior authorization identifiers of prior authorizations that match the clearing records, and/or prior purchase identifiers that match merchandise return clearing records.

When the authorizing entity computer 303 receives the clearing records, it may use the data produced by the artificial intelligence model 302 to may take actions based on the predictions in the clearing records. For example, if the authorizing entity computer 303 receives an unmatched profiling score indicating that there is a high likelihood of a match to a prior authorization, and/or equivalently that the transaction is low risk (e.g., low risk or that the clearing record does not correspond to a real authorization), the authorizing entity computer 303 may drop the pending hold and post the transaction. Otherwise, if the unmatched profiling score indicates that there is a low likelihood of a match to a prior authorization, or equivalently that the transaction is high-risk, the authorizing entity computer 303 may review the transaction in detail before posting.

During step S33, the clearing system 301 may also return clearing records that the artificial intelligence model 302 determined to be problematic back to the transport computer 300 for the transport computer 300 to amend. Problematic clearing records may include a duplicate clearing resulting from a processing error by the transport computer 300. For example, if the artificial intelligence model 302 determines a duplicate profiling score indicating that there is a high likelihood that a clearing record is a duplicate, the clearing system 301 may remove the clearing record from the outgoing clearing draft to the authorizing entity computer 303, and send it to the transport computer 300. In some embodiments, the clearing system 301 may notify the authorizing entity computer 303 of the problematic clearing records.

Figure 4:
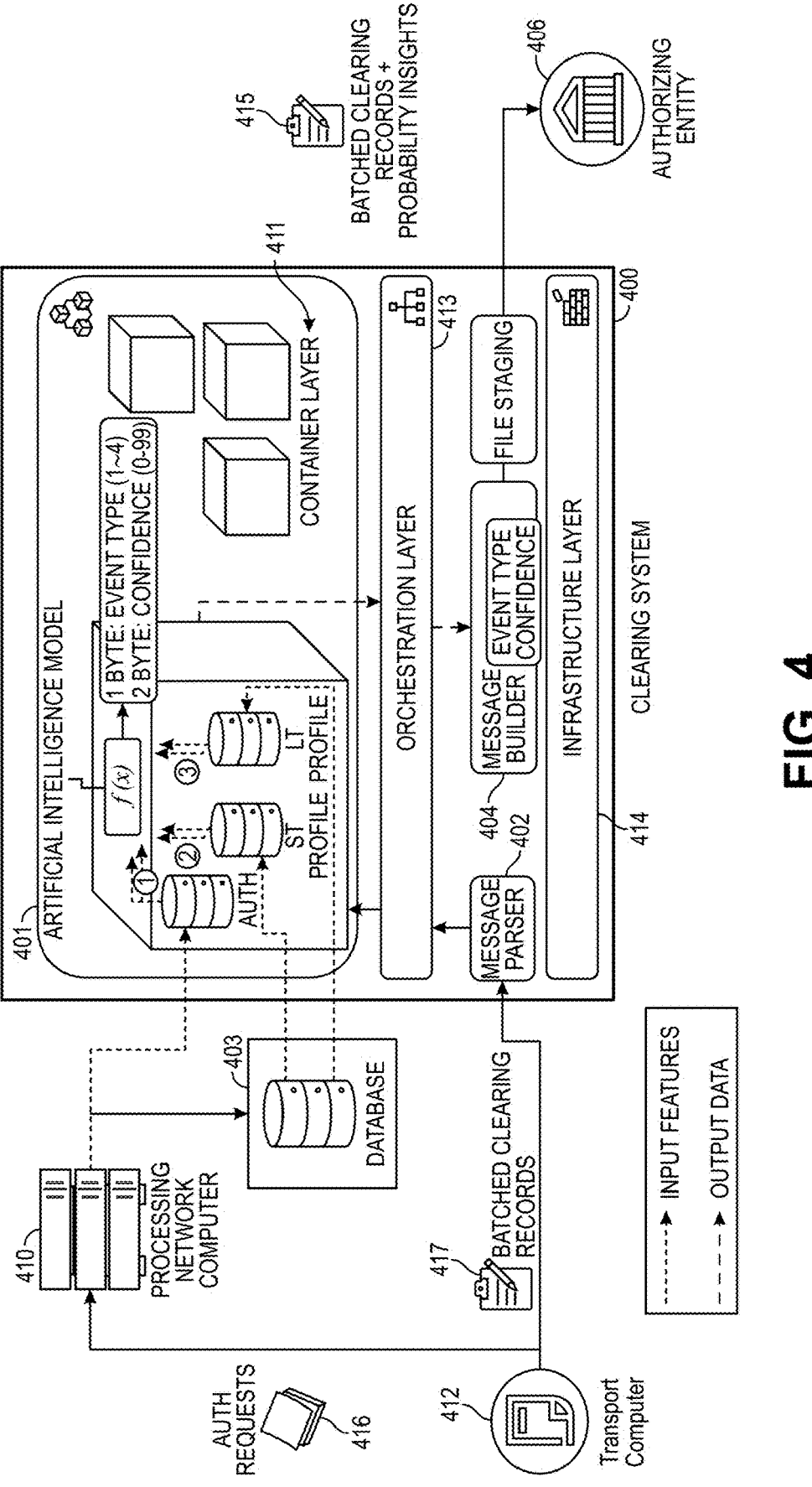
FIG. 4 shows an architecture of a clearing system according to some embodiments.

Some embodiments may incorporate a clearing system with a technical architecture as shown in FIG. 4. FIG. 4 shows a block diagram of a processing network computer 410 in communication with a clearing system 400, a database 403, an authorizing entity 406, and a transport computer 412. In some embodiments, the processing network computer 410 comprises the clearing system 400 and the database 403. The clearing system 400 may comprise a container layer 411 comprising an artificial intelligence model 401, an orchestration layer 413 comprising a message parser 402 and a message builder 404, and an infrastructure layer 414.

The clearing system 400 can one or more processors, and one or more computer readable media comprising code executable by one or more processor for performing a method comprising: receiving a clearing file comprising a plurality of clearing records; inputting the clearing records into an artificial intelligence model; determining predictions relating to the clearing records; and providing the predictions to an authorizing entity computer, whereby the authorizing entity computer performs an action based on the predictions.

The message parser 402 can comprise executable code for receiving batched clearing records 417 from the transport computer 412, parsing and translating data into a desired format, and transmitting it to the artificial intelligence model 401. For example, the message parser 402 can comprise executable code for extracting data elements such as transaction amount, account identifier, resource provider identifier, etc., from batched clearing records 417.

The artificial intelligence model 401 can comprise executable code for analyzing clearing records and determining clearing scores, and transmitting the clearing score data to the message builder 404. In some embodiments, the artificial intelligence model 401 may be a neural network or a deep neural network. The artificial intelligence model 401 may be trained according to relevant features from short-term and long-term profiling databases. Example features may involve relevant historical force posts and/or relevant fraud rates from the past week (e.g., short-term profiling) and the past year (e.g., long-term profiling). Other features may include merchant category codes (MCC), transaction methods (e.g., if it was a card-not-present (CNP) transaction), the values of transactions, resource provider identifiers, transaction dates/times, clearing dates/times, settlement dates/times, geographic locations of transactions, etc. Any of these features may be converted to embeddings, which may be used to train the artificial intelligence model 401 to make appropriate predictions. The clearing system 400 can determine if the predictions that are made by the artificial intelligence model 410 were accurate or not (e.g., based on further feedback from an entity operating a transport computer or an authorization entity computer), and this feedback can be used to train the artificial intelligence model 401 so that it can learn and improve its predictions.

The message builder 404 can comprise executable code for consolidating clearing records and clearing scores into outgoing files. For example, the message builder 404 can comprise executable code for receiving the clearing score data from the artificial intelligence model 401, appending clearing score data (e.g., event type and confidence) into a file with the clearing records, and transmitting it to an authorizing entity 406.

The database 403 can be a Hadoop database and can store authorization request messages 416 from transport computer 412, short term profiling historical data (e.g., data from transactions that occurred in the past 24 hours), and long term profiling historical data (e.g., averages of data over the past 12 months). All of this data, as well as other data, can be used to train the artificial intelligence model 401.

Figure 5:
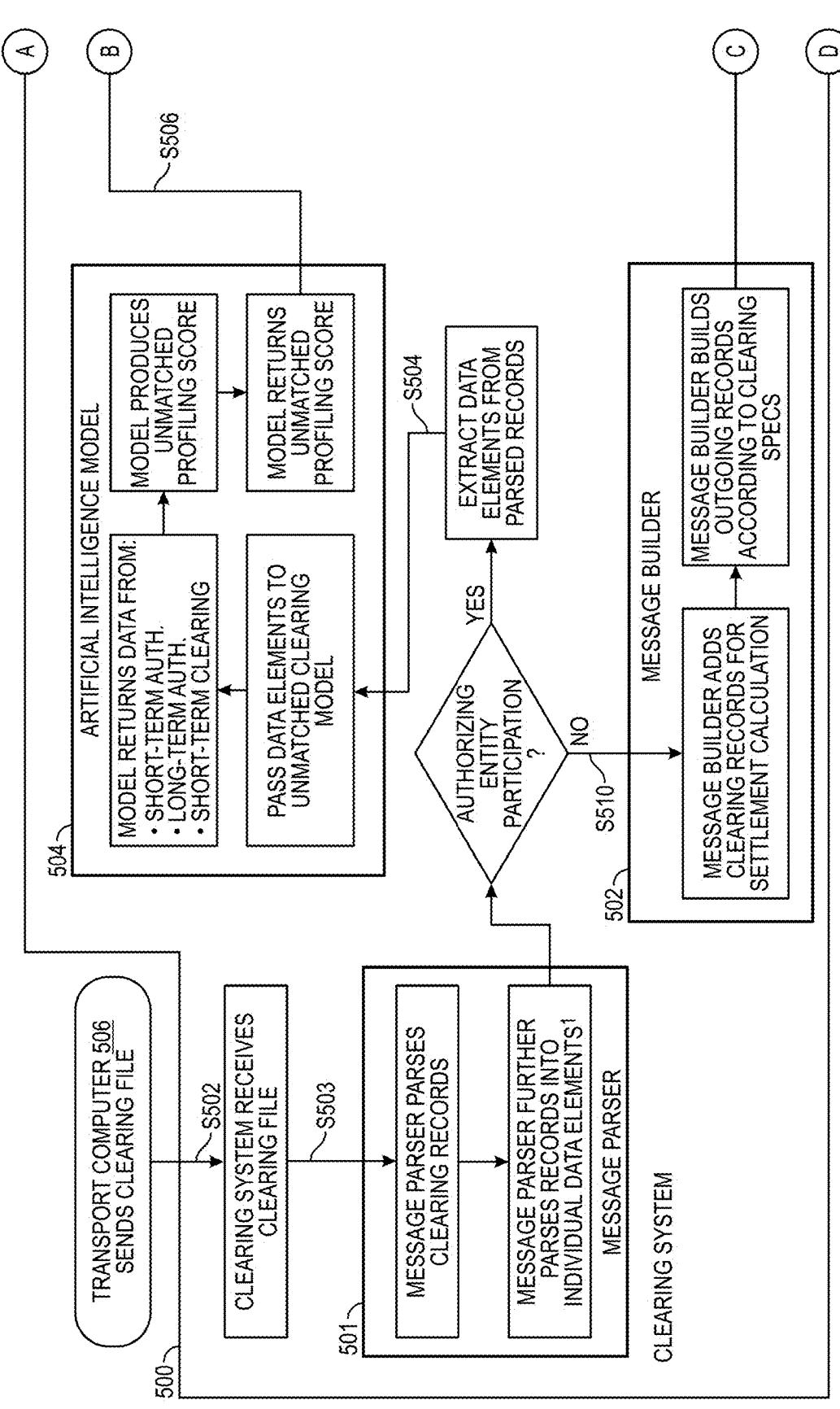
FIG. 5 depicts a process flow of a clearing system according to embodiments in the case of an unmatched clearing.
Figure 5:
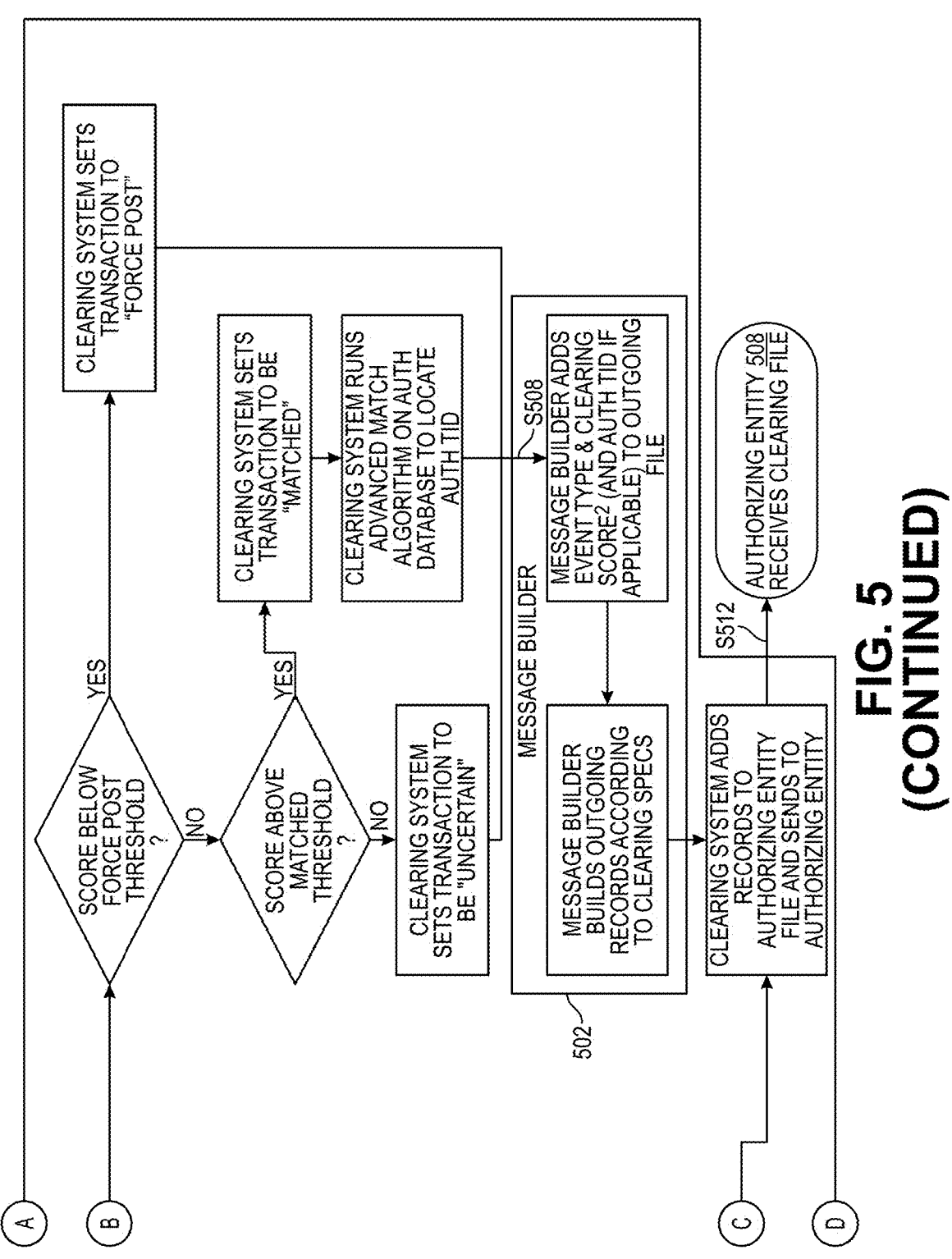

FIG. 5 depicts a process flow of a clearing system 500 according to embodiments in the case of an unmatched clearing. The clearing system 500 can comprise a message parser 501, a message builder 502, and an artificial intelligence model 504. The clearing system 500 can be in communication with an authorizing entity 508 and a transport computer 506.

In step S502 the transport computer 506 may receive a clearing record from a resource provider computer (and other resource provider computers) and send it to the clearing system 500 to be parsed by the message parser 501.

In step S503, the message parser 501 can parse the clearing records, extract relevant data elements, and translate data into a desired format. Data elements may include Auth TID (authorization transaction ID), Auth Code (authorization code), Merchant Name, Amount, PAN (primary account number), Acquirer BIN (bank identification number), Acquirer reference, Merchant Industry, MCC (merchant category code), Payment Channel, time and date of the transaction, etc.

In step S504, if the authorizing entity 508 elects to participate in the clearing process according to embodiments, the message parser 501 transmits the data elements to the unmatched clearing submodel of the artificial intelligence model 504. The artificial intelligence model 504 can produce an unmatched profiling score indicating the likelihood of a matched transaction after it receives the clearing record data as an input. It can also predict a timeframe code to indicate the timeframe that the prior authorization is likely to fall within. In some cases, it can retrieve the other data such as short-term authorization data, long-term authorization data, and short-term clearing data to input along with the clearing record data or to accompany the score. Such data may also be used to train the artificial intelligence model 504 (or its corresponding submodel).

If the likelihood of a matched transaction is high and the model determines a high unmatched profiling score, it may be low-risk. If the likelihood of a matched transaction is low (e.g., the model determines a low unmatched profiling score), it may indicate that the transaction is high-risk and it may be a force post. For example, the feature data may comprise the resource provider's historical rate of force posts. If the resource provider has a history of force posts, the artificial intelligence model 504 may provide a low unmatched profiling score indicating that likelihood of a matched transaction is low. After determining the unmatched profiling score, the artificial intelligence model 504 returns the unmatched profiling score to the clearing system 500.

If the authorizing entity 508 does not wish to participate in the clearing process solution according to embodiments, the artificial intelligence model 504 is not invoked in step S504.

In step S506, if the artificial intelligence model 504 was invoked, the clearing system 500 can use the unmatched profiling score to categorize the event type. If the unmatched profiling score is sufficiently high and it is sufficiently likely to have a matched transaction, the clearing system 500 may categorize the transaction as matched. Conversely, the clearing system 500 may categorize a transaction with a low unmatched profiling score as a "force post," because it is unlikely to have a matched transaction. The clearing system 500 can define a threshold for a force post and a matched transaction. If the unmatched profiling score indicating the likelihood of a matched transaction is below the force post threshold the clearing system 500 can categorize the clearing record to be a force post. If the unmatched profiling score is not below the force post threshold and above the matched threshold, then the clearing system 500 can categorize the clearing record as matched. For a matched clearing record, the clearing system 500 can search for the authorization in an authorization database comprising prior authorizations and locate the matching prior authorization identifier. If the unmatched profiling score is between the matched threshold and the force post threshold, neither below the force post threshold nor above the matched threshold, then the clearing system 500 can categorize the clearing record as uncertain.

In some embodiments, in step S506, it is the artificial intelligence model 504 that determines the event type based on the unmatched profiling score. For example, the artificial intelligence model 504 may compare the unmatched profiling score against the force post threshold and matched transaction threshold as described above in order to categorize the event type. Then, the artificial intelligence model 504 can transmit the unmatched profiling score with the data indicating the event type to the clearing system 500.

In step S508, the clearing system 500 can send the data indicating event type and unmatched profiling score to the message builder 502. The message builder 502 can compile an outgoing file comprising a clearing record, an event type, an unmatched profiling score, and optionally a timeframe code. If the event type is matched then the clearing system may append the prior authorization identifier of the matched clearing record to outgoing files so that the authorizing entity 508 does not need to manually search for the prior authorization.

If the authorizing entity 508 does not participate in the clearing process solution according to embodiments and the artificial intelligence model 304 is not invoked, then in step S510 the message builder 502 compiles an outgoing file for settlement calculations including the clearing record but without an event type or unmatched profiling score from the artificial intelligence model 504.

In step S512, the clearing system 500 transmits the outgoing file to the authorizing entity 508. The authorizing entity 508 can make an informed decision whether or not to drop the pending hold and post the transaction or to review the transaction in detail. For example, the authorizing entity 508 may review transactions that are categorized as force post (e.g., low unmatched profiling scores) in detail to determine if they are fraudulent force posts. For transactions that are categorized as matched (e.g., high unmatched profiling score), the authorizing entity 508 may drop the pending hold and post the transaction without first searching for the matching authorization.

Figure 6:
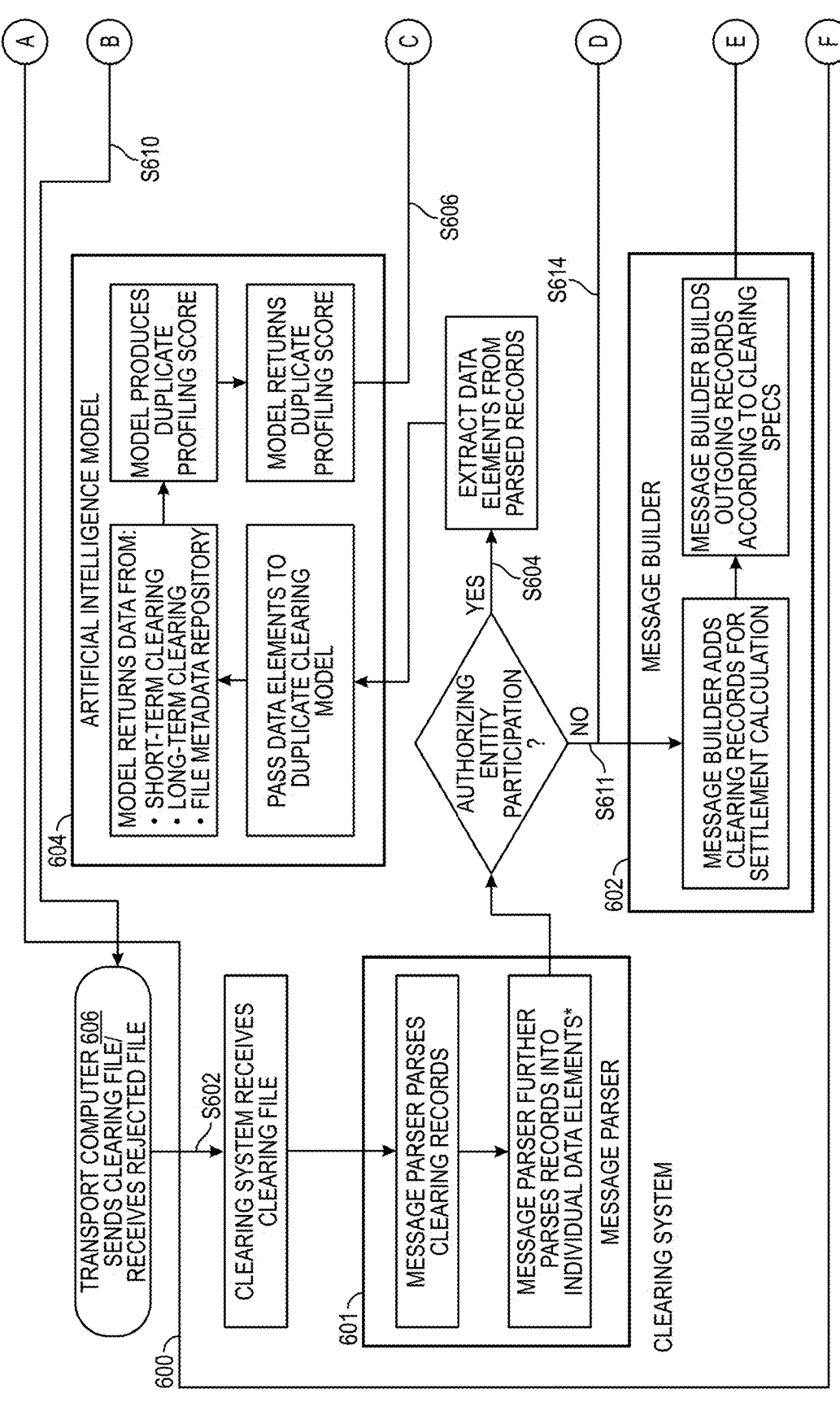
FIG. 6 depicts a process flow of a clearing system according to embodiments in the case of a duplicate clearing.
Figure 6:
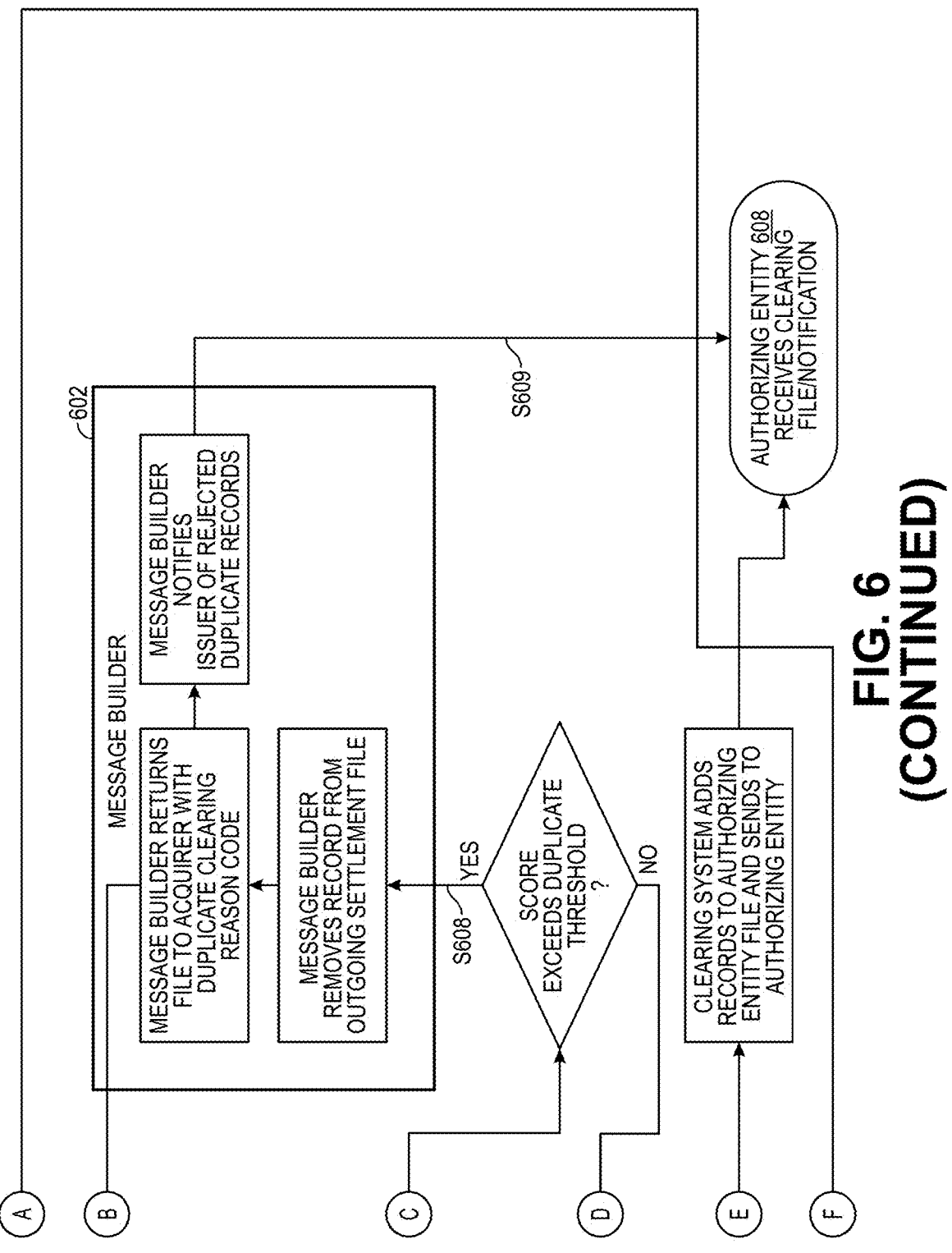

FIG. 6 depicts a process flow of a clearing system according to embodiments in the case of a duplicate clearing. The clearing system 600 can comprise a message parser 601, a message builder 602, and an artificial intelligence model 604. The clearing system 600 can be in communication with an authorizing entity 608 and a transport computer 606.

Duplicate clearings can occur when the resource provider or transport computer 606 submits more than one clearing record for a single authorization. However, sometimes there may be similar clearing records for two separate transactions (e.g., a user makes two separate purchases with the resource provider for the same amount). The clearing system 600 invokes the artificial intelligence model 604 to determine the likelihood that a clearing record is a duplicate clearing. If the artificial intelligence model 604 determines that there is a high likelihood that a clearing record is a duplicate clearing, the clearing system 600 may categorize the event type as a duplicate clearing. The clearing system 600 may filter clearing records that are categorized as duplicate clearings from settlement files before they reach the authorizing entity 608 so that the user does not see a double posted transaction. The clearing system 600 can send the clearing records of the duplicate clearings to the transport computer 606 to fix. The authorizing entity 608 may also be notified that a duplicate clearing was rejected.

In step S602 the transport computer 606 may send a clearing record through the clearing system 600 to the message parser 601. The clearing record may be a new transaction sent from a resource provider, or it may be a rejected clearing record received from the clearing system 600. The message parser 601 can parse the clearing records, extract relevant data elements, and translate data into a desired format. Data elements may include: transaction identifier (TID), authorization code, resource provider, transaction amount, PAN, retrieval reference number, file record number, etc.

In step S604, if the authorizing entity 608 elects to participate in the clearing process according to embodiments, the formatted data from the message parser 601 is transmitted to the duplicate clearing submodel of the artificial intelligence model 604. The artificial intelligence model 604 can determine a duplicate profiling score indicating the likelihood of a duplicate clearing record after receiving data associated with the clearing record as an input. The artificial intelligence model 604 can also retrieve data from databases (e.g., short-term authorization data, long-term authorization data, and file metadata) to use in its determination of the score, or as additional data to accompany the score. Such information may also be used to train the artificial intelligence model 604. If the authorizing entity 608 does not wish to participate in the clearing process solution according to embodiments, the artificial intelligence model 604 is not invoked in step S604.

If the authorizing entity 608 does not participate in the clearing process solution according to embodiments and the artificial intelligence model 604 is not invoked, then in step S611 the message builder 602 compiles an outgoing file for settlement calculation including the clearing record but without an event type or duplicate profiling score from the artificial intelligence model 604. The file is sent to the authorizing entity 608 without the event type and duplicate profiling score.

In step S606, if the artificial intelligence model 604 was invoked, the clearing system 600 can use the duplicate profiling score to determine the event type. The clearing system can define a threshold for a duplicate clearing. If the duplicate profiling score is above the duplicate clearing threshold the clearing system 600 can set the event type to be a duplicate clearing. If the duplicate profiling score is under the duplicate clearing threshold, then the record is not categorized as a duplicate clearing.

In some embodiments, in step S606, it is the artificial intelligence model 604 that determines the event type based on the duplicate profiling score. For example, the artificial intelligence model 604 may compare the unmatched profiling score against the duplicate clearing threshold as described above in order to categorize the event type. Then, the artificial intelligence model 604 can transmit the duplicate profiling score with the data indicating the event type to message builder 602.

If the duplicate profiling score is above the duplicate clearing threshold, then in step S608 the message builder 602 may remove the record from outgoing transaction settlement files so that the authorizing entity computer does not post two charges for the same transaction. The message builder 602 can notify the authorizing entity 608 that the duplicate clearing record was rejected by the clearing system 600 and removed from the settlement file in step S609. The message builder 602 can return the clearing record with an indication that it is a duplicate clearing (e.g., duplicate clearing reason code) back to the transport computer to fix in step S610.

In step SS14, if the duplicate profiling score is below the duplicate clearing threshold and it is not categorized as a duplicate clearing, the message builder 602 compiles the outgoing records. The message builder 602 can compile an outgoing file comprising a clearing record, an event type, and a duplicate profiling score, and send it to the authorizing entity 608.

Figure 7:
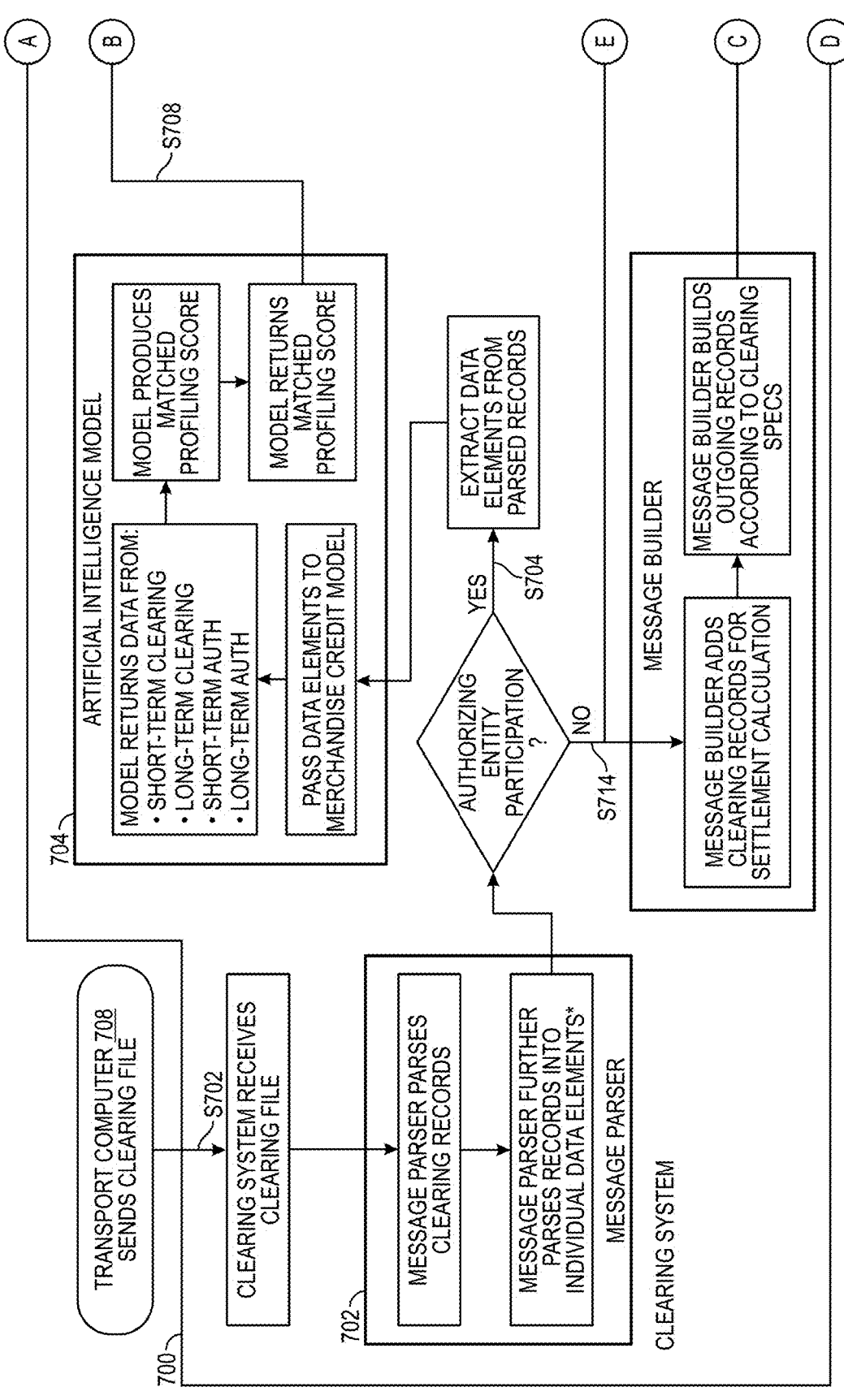
FIG. 7 depicts a process flow of a clearing system according to embodiments in the case of a delayed clearing refund.
Figure 7:
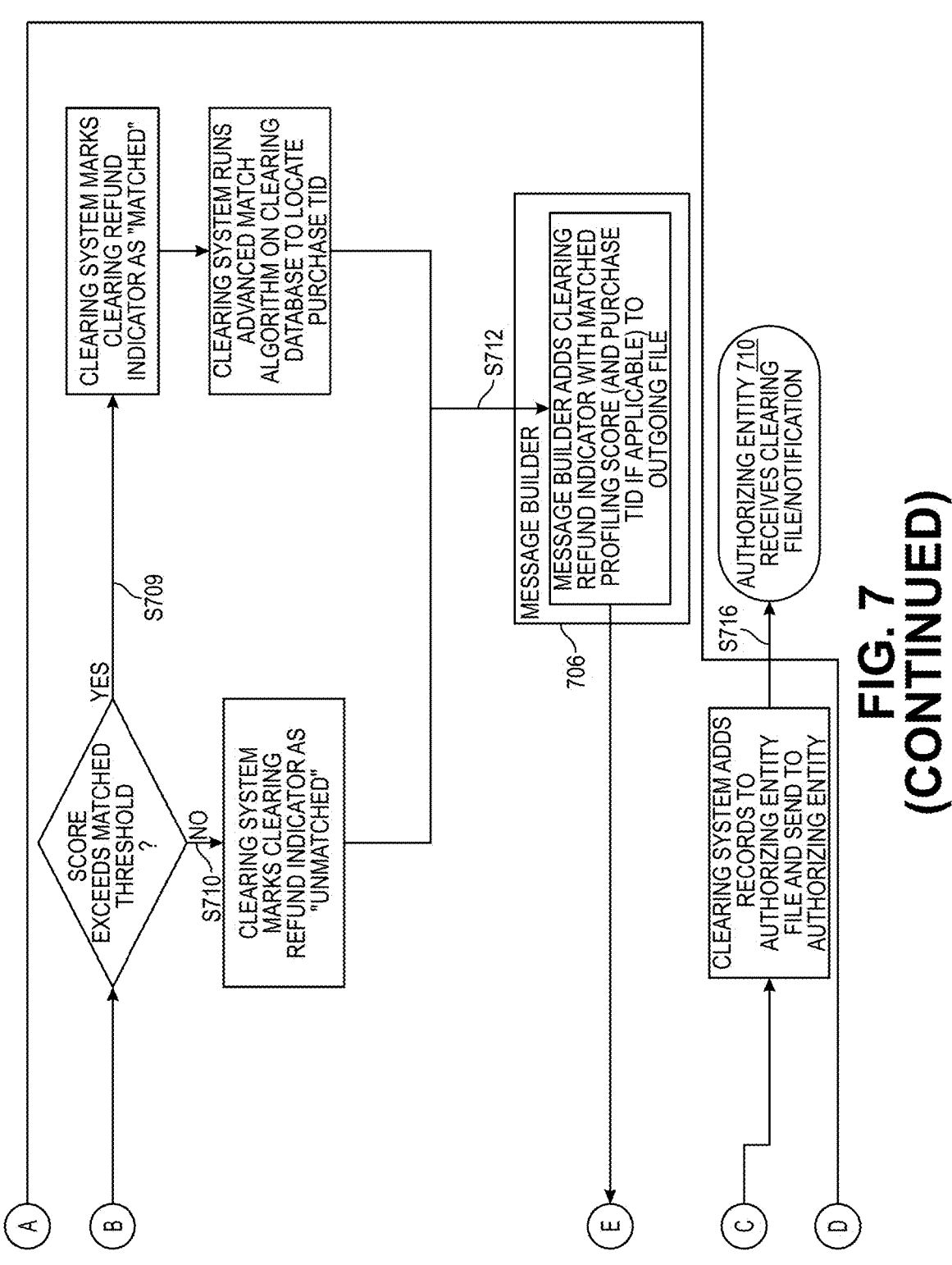

FIG. 7 depicts a process flow of a clearing system 700 according to embodiments in the case of a delayed clearing refund. The clearing system 700 can comprise a message parser 702, a message builder 706, and an artificial intelligence model 704. The clearing system 700 can be in communication with an authorizing entity 710 and a transport computer 708.

Refund transactions may be associated with high risk because they can be a mechanism for fraud. To mitigate fraud, authorizing entities match clearing records for refund transactions with the corresponding previous purchase transactions and ensure that the right amount is being credited to the user. However, there is no systematic way to link the return to the original purchase, because the transaction identifier for the purchase transaction is not the same as the transaction identifier for the refund transaction. This process is time consuming and delays refund transactions. The clearing system 700 can invoke an artificial intelligence moel 704 to determine a score indicating the likelihood of a matched prior purchase for a refund transaction clearing record. Based on the score, the clearing system 700 can categorize the refund transaction as matched or unmatched. If the clearing system 700 categorizes the refund transaction as matched, the clearing system can determine the transaction identifier of the previous purchase transaction so that the authorizing entity 710 does not need to search for it manually.

In step S702 the transport computer 708 may receive a clearing record from a resource provider and send it to the clearing system to be parsed by the message parser 702. The message parser 702 can parse the clearing record, extract relevant data elements, and translate data into a desired format. Data elements may include transaction identifiers, authorization code, resource provider, transaction amount, PAN, card acceptor location, transport computer identifier, etc.

In step S704, if the authorizing entity 710 elects to participate in the clearing process according to embodiments, the formatted data from the message parser 702 is transmitted to the merchandise return submodel of the artificial intelligence model 704. The artificial intelligence model 704 can extract relevant feature data from historical databases and use it to produce a matched profiling score indicating the likelihood of a matched prior purchase. The historical databases may include short-term authorization data, long-term authorization data, short-term clearing data, and long-term clearing data. If the authorizing entity 710 does not wish to participate in the clearing process solution according to embodiments, the artificial intelligence model 704 is not invoked in step S704.

In step S708, if the artificial intelligence model 704 was invoked, the clearing system 700 can use the matched profiling score received from the artificial intelligence model 704 to determine if the clearing can be matched to a prior purchase. The clearing system can define a threshold clearing score requirement for a record's clearing refund indicator to be marked as matched. If the matched profiling score is above the threshold, the clearing system 700 can mark the clearing refund indicator as matched in step S709. For a matched clearing record, the clearing system 700 can search for the prior purchase in a clearing database to locate a purchase transaction identification of the original clearing purchase. If the matched profiling score is below the threshold, then the clearing system 700 can categorize the clearing refund indicator as unmatched in step S710.

In some embodiments, in step S708, it is the artificial intelligence model 704 that determines the event type based on the matched profiling score. For example, the artificial intelligence model 704 may compare the matched profiling score against the threshold as described above in order to categorize the event type. Then, the artificial intelligence model 704 can transmit the matched profiling score with the data indicating the event type to the message builder 706.

In step S712, the message builder 706 receives the clearing refund indicator data and the matched profiling score. The message builder 706 can compile an outgoing file comprising a clearing record, clearing refund indicator, and a matched profiling score. If the clearing refund indicator is matched, then the outgoing file may also include a purchase transaction identification of the original clearing purchase so that the authorizing entity 710 does not need to search for the original clearing purchase record by hand.

If the authorizing entity 710 does not participate in the clearing process solution according to embodiments and the artificial intelligence model 704 is not invoked, then in step S714 the message builder 706 compiles an outgoing file for settlement calculations including the clearing record but without the clearing refund indicator or matched profiling score from the artificial intelligence model 704.

In step S716, the clearing system 700 transmits the outgoing file to the authorizing entity 710. The authorizing entity 710 can make an informed decision based on the clearing system's predictions.

Embodiments of the disclosure have a number of technical advantages. Annually, 1% of clearings cannot be matched or have no prior authorization, and there are nearly 600 million potential duplicate clearing drafts. Embodiments can tackle these processing issues by providing clearing scores based on historical and real time transaction data. With embodiments, the the transaction matching step of the clearing phase is optimized, and the number of duplicate clearings can be greatly reduced. Authorizing entities can readily make informed decisions during transaction matching and can save on operational costs, personnel time, and system bandwidth.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a clearing system comprising a container layer, an orchestration layer, a message builder, a message parser, and an artificial intelligence model, a clearing file comprising a plurality of clearing records;

parsing, by the message parser, the clearing records;

providing, by the message parser, the parsed clearing records to the orchestration layer;

providing, by the orchestration layer, the parsed clearing records to the container layer;

inputting, by the clearing system, the clearing records into the artificial intelligence model, wherein the artificial intelligence model is in the container layer in the clearing system;

determining, by the artificial intelligence model, predictions relating to the clearing records, wherein the predictions relating to the clearing records comprise scores indicating a likelihood of a match to a prior authorization, a likelihood of a duplicate clearing record, and/or the likelihood of matching to a prior purchase record; and providing, by the clearing system, the predictions to an authorizing entity computer, whereby the authorizing entity computer posts a transaction associated with a clearing record in the clearing records to an account associated with a user conducting the transaction or reviews the transaction in detail based on the predictions.

2. The method of claim 1, wherein the clearing file is received from a transport computer, and the predictions comprise the scores indicating the likelihood of the duplicate clearing record, and wherein the method further comprises:

determining, by clearing system, if the scores indicating a likelihood of a duplicate clearing record exceed a threshold; and providing the clearing records with scores indicating the likelihood of the duplicate clearing record above the threshold to the transport computer.

3. The method of claim 1, wherein the clearing system comprises a database storing data related to a plurality of authorization request messages, wherein each authorization request message is associated with an authorization identifier.

4. The method of claim 3, wherein the predictions comprise the scores indicating the likelihood of a match to prior authorizations, and wherein the method further comprises:

determining if the scores indicating the likelihoods of matches to the prior authorizations exceed a threshold;

determining, by the clearing system, prior authorization request messages that match clearing records associated with the scores exceeding the threshold; and providing the data related to the prior authorization request messages to the authorizing entity computer.

5. The method of claim 1, wherein the predictions related to the clearing records comprise the scores indicating the likelihood of matching to a prior transaction record, and wherein the method further comprises:

determining clearing records with scores exceeding a threshold;

determining, by the clearing system, identifiers for prior transaction records that match the clearing records that have scores exceeding the threshold; and providing the identifiers for the prior transaction records to the authorizing entity computer.

6. The method of claim 1, wherein the clearing system comprises a short term database comprising transaction data for recent transactions and a long term database comprising transaction data for historical transactions, wherein the transaction data from the short term database and the transaction data from the long term database are used to train the artificial intelligence model.

7. The method of claim 1, wherein the predictions are encoded in data strings, wherein each data string comprises a first portion encoding an event type, and a second portion encoding a score.

8. The method of claim 1, wherein:

the authorizing entity computer posts the transaction based on determining that the transaction can be posted without further verification.

9. The method of claim 1, further comprising determining, by the clearing system, event type indicators for the clearing records based on the scores, wherein each event type indicator indicates if a clearing record is a force post clearing record, a matched clearing record, or an unmatched clearing record.

10. The method of claim 1, further comprising:

training the artificial intelligence model by obtaining transaction data for recent transactions from a short term database and transaction data for historical transactions from a long term database, extracting features from the transaction data, embedding the features, providing the embedded features to the artificial intelligence model to generate training output, and updating the artificial intelligence model based on the training output.

11. A clearing system comprising:

one or more processors; and one or more computer readable media comprising code, comprising a container layer, an orchestration layer, a message builder, and a message parser, executable by the one or more processors to perform a method comprising:

receiving a clearing file comprising a plurality of clearing records;

parsing, by the message parser, the clearing records;

providing, by the message parser, the parsed clearing records to the orchestration layer;

providing, by the orchestration layer, the parsed clearing records to the container layer;

inputting the clearing records into an artificial intelligence model, wherein the artificial intelligence model is in the container layer in the clearing system;

determining predictions relating to the clearing records, wherein the predictions relating to the clearing records comprise scores indicating a likelihood of a match to a prior authorization, a likelihood of a duplicate clearing record, and/or the likelihood of matching to a prior purchase record; and providing the predictions to an authorizing entity computer, wherein the authorizing entity computer posts a transaction associated with a clearing record in the clearing records to an account associated with a user conducting the transaction or reviews the transaction in detail based on the predictions.

12. The clearing system of claim 11, wherein the artificial intelligence model is a deep neural network.

13. The clearing system of claim 11, wherein the method further comprises:

building, using the message builder, messages comprising the predictions to the authorizing entity computer.

14. The clearing system of claim 11, wherein the artificial intelligence model is a neural network.

15. The clearing system of claim 11, further comprising:

a short term database comprising transaction data for recent transactions; and a long term database comprising transaction data for historical transactions, wherein the transaction data from the short term database and the transaction data from the long term database are used to train the artificial intelligence model, wherein the short term database and the long term database are in communication with the one or more processors.

16. The method of claim 10, further comprising:

receiving feedback from the authorizing entity computer; and updating the artificial intelligence model based on the feedback.

17. The clearing system of claim 11, wherein receiving the clearing file comprising the plurality of clearing records comprises receiving the clearing file comprising the plurality of clearing records from a transport computer, the transport computer associated with a plurality of resource providers.

18. A data processing system comprising:

a clearing system comprising, one or more processors, and one or more computer readable media comprising code, comprising a container layer, an orchestration layer, a message builder, and a message parser, executable by the one or more processors to perform a method comprising, receiving a clearing file comprising a plurality of clearing records, parsing, by the message parser, the clearing records, providing, by the message parser, the parsed clearing records to the orchestration layer, providing, by the orchestration layer, the parsed clearing records to the container layer, inputting the clearing records into an artificial intelligence model, wherein the artificial intelligence model is in the container layer in the clearing system, determining predictions relating to the clearing records, wherein the predictions relating to the clearing records comprise scores indicating a likelihood of a match to a prior authorization, a likelihood of a duplicate clearing record, and/or the likelihood of matching to a prior purchase record, and providing the predictions to an authorizing entity computer, whereby the authorizing entity computer posts a transaction associated with a clearing record in the clearing records to an account associated with a user conducting the transaction or reviews the transaction in detail based on the predictions; and the authorizing entity computer.

19. The clearing system of claim 15, wherein the training comprises:

obtaining transaction data for recent transactions from the short term database and transaction data for historical transactions from the long term database, extracting features from the transaction data, embedding the features, providing the embedded features to the artificial intelligence model to generate training output, and updating the artificial intelligence model based on the training output.

20. The data processing system of claim 18, the method further comprising:

training the artificial intelligence model by obtaining transaction data for recent transactions from a short term database and transaction data for historical transactions from a long term database, extracting features from the transaction data, embedding the features, providing the embedded features to the artificial intelligence model to generate training output, and updating the artificial intelligence model based on the training output; and updating the artificial intelligence model based on feedback received from the authorizing entity computer.

* * * * *